United States Patent

Mueller

[15] 3,691,543

[45] Sept. 12, 1972

[54] POSITIONING SYSTEM INCLUDING SERVO TRACK CONFIGURATION AND ASSOCIATED DEMODULATOR

[72] Inventor: Francis E. Mueller, San Jose, Calif.

[73] Assignee: International Business Machines Corporation, Armonk, N.Y.

[22] Filed: Feb. 8, 1971

[21] Appl. No.: 113,484

[52] U.S. Cl. ..........................................340/174.1 B

[51] Int. Cl. ..............................................G11b 5/02

[58] Field of Search..340/174.1 G, 174.1 H, 174.1 B, 340/174.1 C

[56] References Cited

UNITED STATES PATENTS

| | | | |
|---|---|---|---|
| 3,593,333 | 7/1971 | Oswald | 340/174.1 B |
| 3,185,972 | 5/1965 | Sippel | 340/174.1 C |
| 3,391,400 | 7/1968 | Chao | 340/174.1 B |
| 3,534,344 | 10/1970 | Santana | 340/174.1 C |
| 3,479,664 | 11/1969 | Williams et al. | 340/174.1 C |
| 3,304,542 | 2/1967 | Sutton et al. | 340/174.1 B |
| 3,492,670 | 1/1970 | Ault et al. | 340/174.1 B |
| 3,263,031 | 7/1966 | Welsh | 340/174.1 C |

*Primary Examiner*—Vincent P. Canney
*Attorney*—Hanifin & Jancin and Edward M. Suden

[57] ABSTRACT

The invention relates to a positioning system which provides a series of adjacent servo tracks, the boundary between adjacent servo tracks defining a path for the servo system to follow. The servo track configuration generating an output signal in a transducer which has positive pulses for synchronization and negative pulses for positioning information and gain control information. A demodulator is used for separating the synchronization signal from the position and gain control signals. The synchronization signal is used to separate portions of the positioning and gain control signal so as to generate a positioning signal that is indicative of the position of the transducer with respect to the servo tracks and for generating an automatic gain control signal for the demodulator itself.

10 Claims, 12 Drawing Figures

INVENTOR
FRANCIS E. MUELLER

BY *Edward M. Suden*
ATTORNEY

POSITIONING SYSTEM INCLUDING SERVO TRACK CONFIGURATION AND ASSOCIATED DEMODULATOR

BACKGROUND OF THE INVENTION

1. Field of the Invention

This invention relates to information recording and reproducing systems, and more particularly to random access memory systems which require the accurate positioning of a transducer relative to the information to be recorded or reproduced.

2. Prior Art

With the advent of the use of flux transition to generate servo information as taught by U.S. Pat. No. 3,534,344 entitled "Method and Apparatus for Recording and Detecting Information", the field of positioning servo systems has been greatly expanded.

Servo systems of this type have the inherent problem that each servo track generates both positive and negative pulses and therefore in order to obtain accurate positioning information from the servo signal generated in the servo head, a demodulator must be designed to separate the positive and negative transitions of adjacent tracks and for comparing the magnitude of the pulses in adjacent tracks to obtain accurate positioning information. Since both positive and negative transitions are used to generate positioning information, the amplifiers used must be carefully designed such that positive and negative transitions of the same magnitude will obtain the same amplification so that no error would be introduced into the system by the amplifier.

Another problem within servo systems of this type is the problem of obtaining a synchronization signal for controlling the timing of the servo system. In the past, separate synchronization or timing tracks have been used.

It is the object of this invention to provide a novel track configuration which provides synchronization information, positioning information and gain control information.

A further object of this invention is to provide the synchronization information as pulses of only one polarity and for all positioning information and gain control information to be pulses of the other polarity.

Still another object of this invention is to provide a demodulator for separating the synchronization signal from the positioning and gain control signal in the servo signal generated by the servo transducer and for generating a fine positioning signal for the servo system and an automatic gain control signal for the demodulator.

SUMMARY OF THE INVENTION

Briefly, the invention is directed toward a servo positioning system having a servo track configuration and its associated demodulator. The servo track configuration will generate pulses of one polarity for synchronization in the servo transducer and pulses of the other polarity, the amplitude of which is indicative of the transducer's position with respect to the servo track, in the servo transducer. The position pulses induced in the servo transducer also contain automatic gain control information. A demodulator is provided for receiving the signal generated in the servo transducer, using the synchronization pulses to separate the position pulses such that the position pulses may be properly compared to obtain positioning information and further may be properly combined to obtain the automatic gain control signal for the demodulator.

The advantage of such a track configuration and demodulator is that the amplifier design criteria are greatly reduced since the critical positioning information is now carried by pulses of a single polarity at the point where their amplitudes are equal, and therefore inherent amplifier non-linearity will not cause off-track error in the servo system.

Another advantage of the system is that synchronization information is presented by the same servo transducer that is generating servo information therefore making the timing of the read/write data system more reliable.

BRIEF DESCRIPTION OF THE DRAWINGS

The foregoing and other objects, features and advantages of the invention will be apparent from the following more particular description of preferred embodiments of the invention as illustrated in the accompanying drawings.

DESCRIPTION OF THE PREFERRED EMBODIMENT

Figure 1:
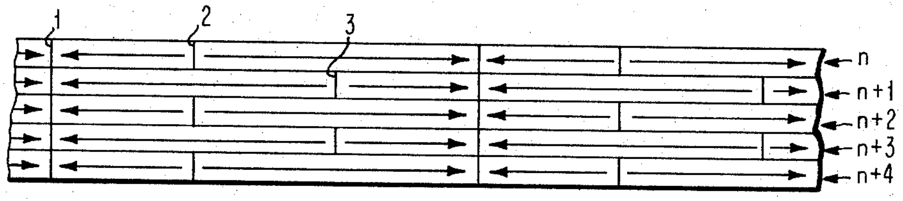
FIG. 1 is a illustration of the novel servo track configuration, the configuration repeating every two servo tracks.
Figure 6:
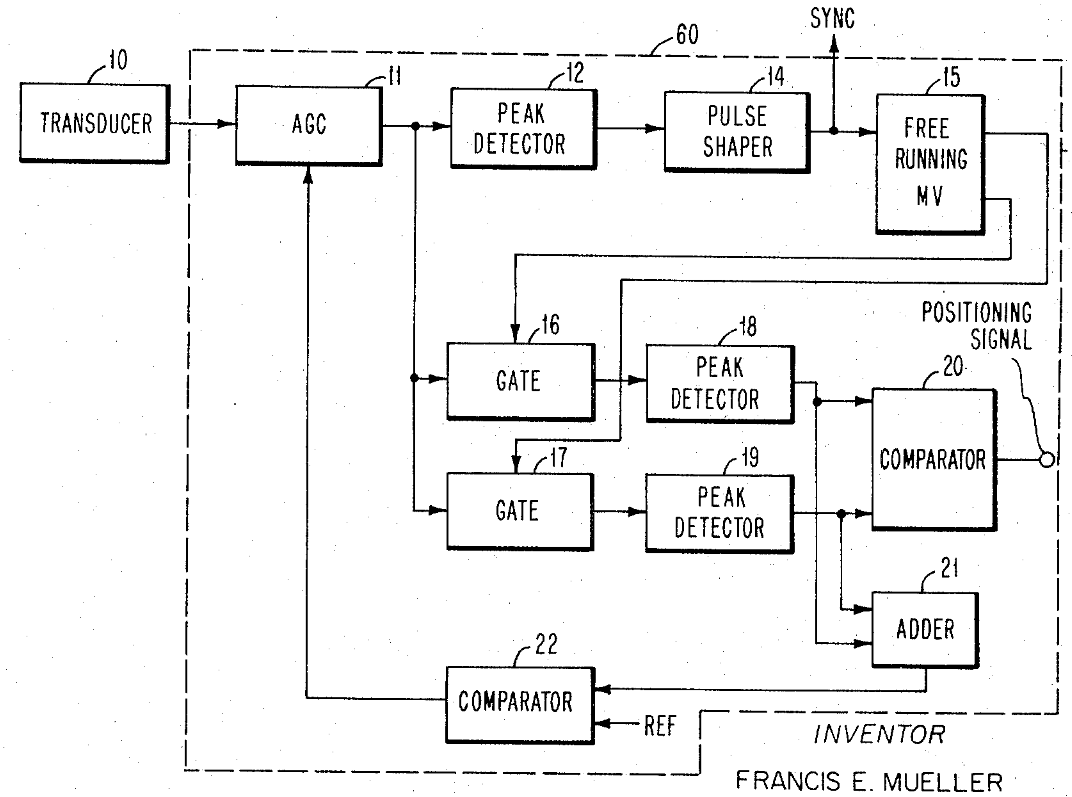
FIG. 6 shows the demodulator for demodulating the information generated in the servo head from the track configuration of FIG. 1.

The preferred embodiment of the invention is a combination of the track configuration shown in FIG. 1 and its associated demodulator shown in FIG. 6.

With reference to FIG. 1, the track configuration of the invention is shown. It should first be noted that all positive transitions 1 occur at the same position on all servo tracks. Further the requirement for the track configuration is that negative transitions on adjacent servo tracks occur at different positions. By viewing track *n*, *n*+1, and *n*+2, it can be seen that negative transitions 2 and 3 on tracks *n* and *n*+1 occur at different times. Further, it can be realized that the position of the negative transitions is repetitive and appears in a fixed sequence.

Figure 2:
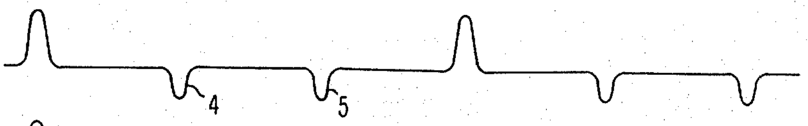
FIG. 2 shows the waveform generated in the servo transducer when the servo transducer covers two adjacent servo tracks equally.
Figure 3:
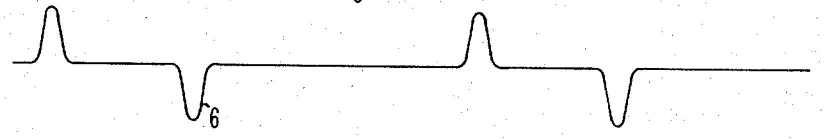
FIG. 3 shows the waveform generated in the servo transducer when the servo transducer is positioned only on even servo tracks.
Figure 4:
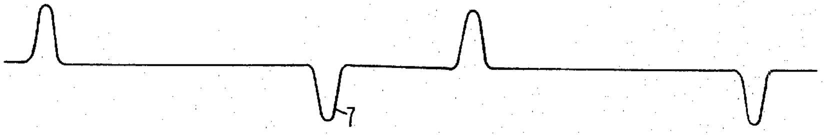
FIG. 4 shows the servo signal generated in the servo transducer when the servo transducer is positioned only on the odd servo tracks.
Figure 5:
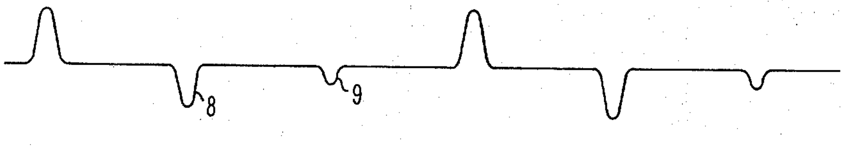
FIG. 5 shows the signal generated in the servo transducer when the servo transducer is positioned unequally over two adjacent servo tracks.

A servo transducer centered on the boundary between tracks *n* and *n*+1 will generate a servo signal as shown by the waveform in FIG. 2. The negative transitions 2 and 3 generate negative pulses 4 and 5 of equal amplitude in the waveform of FIG. 2. If the servo transducer was positioned so as to receive only signals from even tracks represented by tracks *n*, *n*+2, etc. the waveform shown in FIG. 3 would be generated in the servo transducer. Under this condition, only one negative pulse 6 would be generated because only negative transition 2 would be sensed by the servo transducer. Similarly, if the servo transducer was positioned entirely over odd tracks represented by *n*+1, *n*+3, the signal generated in the servo transducer would appear as the waveform in FIG. 4. Again, it can be seen that only one negative pulse 7 will occur in the waveform which is generated by the negative transition 3 on the odd servo tracks. When the servo transducer is positioned so as to receive components both from odd and even servo tracks, the signal generated in the servo transducer is exemplified by the waveform shown in FIG. 5. Under these conditions, the servo transducer is not centered on the boundary between adjacent servo tracks and therefore the negative pulses 8 and 9 generated by the negative transitions 2 and 3 will not have the same amplitude.

It should further be noted that in all waveforms shown in FIGS. 2, 3, 4 and 5, all positive pulses were of the same magnitude. This result is achieved by having all positive transitions 1 on all servo tracks aligned such that the signal generated in the servo transducer will be the same regardless of the position of the servo transducer with respect to the servo track. Therefore, as the servo transducer moves across the servo track, the positive transitions will maintain constant amplitude while the negative transitions will vary in amplitude.

With reference to FIG. 6, a demodulator 60 is shown receiving the servo signal from the servo transducer 10. The automatic gain control circuit 11 receives the servo signal generated in the servo transducer 10 and amplifies the servo signal. The output of the automatic gain control circuit is fed to positive peak detector 12 and to gates 16 and 17. Positive peak detector 12 passes the positive pulses of the amplified servo signal to pulse shaper 14. Pulse shaper 14 shapes the positive pulses and synchronizes the free running multivibrator 15 to the frequency of the occurrence of the positive pulses.

Gates 16 and 17 are controlled by the synchronized free-running multivibrator 15 such that the negative transitions that are associated with even tracks will pass through gate 17 and the negative transitions associated with the odd servo tracks will pass through gate 16. Peak detectors 18 and 19 hold the peak value of the negative transitions that are passed by gates 16 and 17, respectively. Comparator 20 compares the output of peak detectors 18 and 19 and generates a positioning signal that is a function of the difference between the magnitude of the output of peak detectors 18 and 19.

The output of peak detectors 18 and 19 are also added together by adder 21 and compared against a reference by comparator 22. The output of comparator 22 is an automatic gain control signal which is fed back to the automatic gain control circuit 11 for controlling the gain of the automatic control circuit 11. It should be noted that the summation of the outputs of peak detectors 18 and 19 should be a constant value and any departure from that constant value would indicate a correction would be needed in the gain of the automatic gain control circuit 11. The reference voltage to comparator 22 is the constant value that would be expected from the summations of the output of peak detectors 18 and 19.

It should further be noted that the output of pulse shaper 14 can be used for synchronization purposes in other parts of the servo system.

Figure 7:
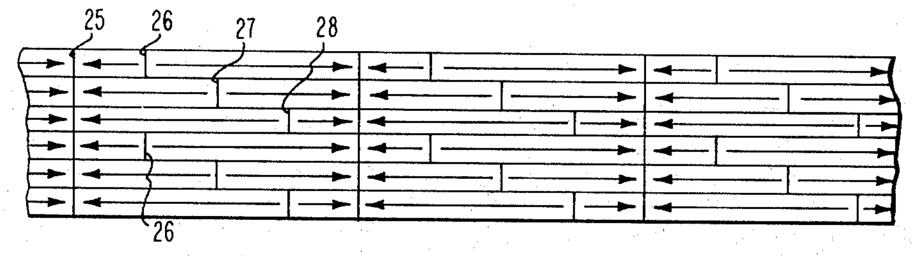
FIG. 7 is an illustration of the track configuration of the invention where the configuration repeats every three servo tracks.
Figure 12:
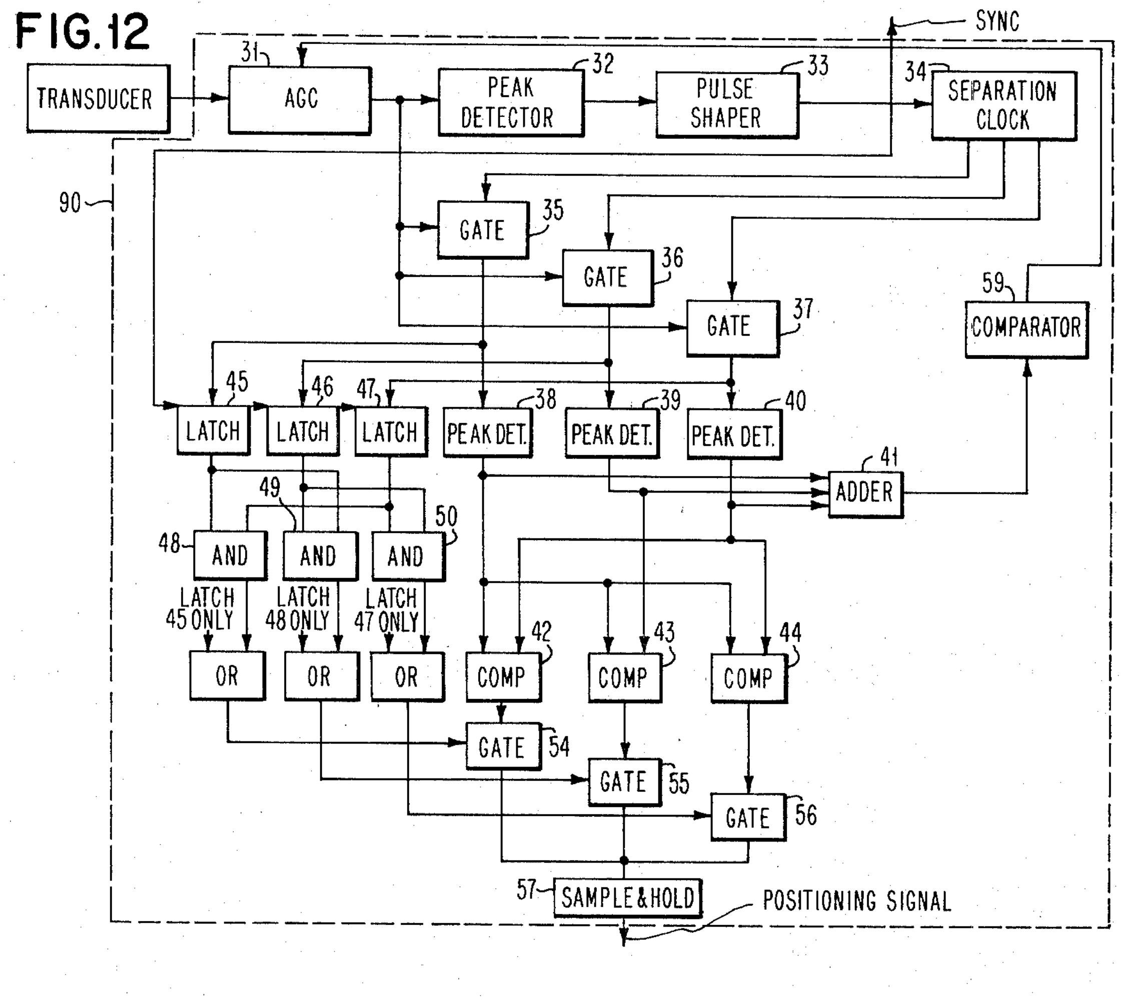
FIG. 12 is a block diagram of the demodulator used for separating the synchronization signal and position and gain control signal generated in the servo transducer from the track configuration as illustrated in FIG. 7.

The second preferred embodiment is shown by the combination of the track configuration shown in FIG. 7 and the demodulator shown in FIG. 12.

The track configuration as shown in FIG. 7 is similar to the track configuration as shown in FIG. 1 except that the sequence of negative transitions occurs every third track rather than every second track. The arrows in each area of each track symbolize the orientations of the magnetic domains in that area. As can be seen from FIG. 7, all positive transitions 25 still occur at the same position across all servo tracks. The criteria that negative transitions do not occur at the same position on adjacent servo tracks is still maintained. Negative transitions 26, 27 and 28 on servo tracks *n*, *n*+1, and *n*+2, respectively, are positioned so as to maintain the negative transition criteria and show the sequence of negative transitions that will be repeated every three servo tracks.

Figure 8:
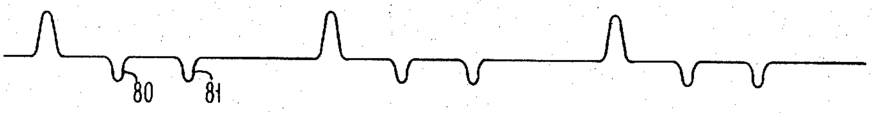
FIG. 8 shows the waveform generated in the servo transducer when the servo transducer is centered over the boundary between servo tracks $n$ and $n+1$.

If the servo transducer was centered over the boundary between servo tracks *n* and *n*+1, the servo signal generated in the servo transducer would be of the waveform as shown in FIG. 8. The negative pulses 80 and 81 are generated by the negative transitions 26 and 27, respectively. No negative pulse is caused by transition 28 on servo track *n*+2 since the servo transducer receives no contribution from that servo track.

Figure 9:
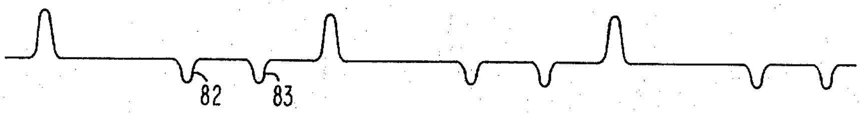
FIG. 9 shows the signal generated in the servo transducer when the servo transducer is positioned on the boundary between servo tracks $n+1$ and $n+2$.

If the servo transducer was centered over the boundary between servo tracks *n*+1 and *n*+2, the resulting servo signal generated in the servo transducer would be of the waveform shown in FIG. 9. Here the negative pulses 82 and 83 would be generated from the negative transitions 27 and 28 occurring in servo tracks *n*+1 and *n*+2, respectively. Again, it should be noted that no negative pulse is seen since no contribution is made by negative transition 26 on servo track *n* or *n*+3.

Figure 10:
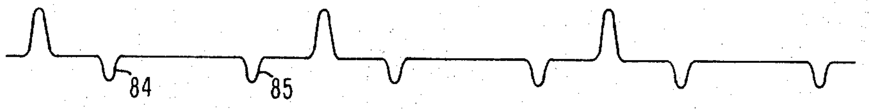
FIG. 10 shows the signal generated in the servo transducer when the servo transducer is positioned on the boundary between tracks $n+2$ and $n+3$.

If the servo transducer were centered over the boundary between servo tracks *n*+2 and *n*+3, the servo signal generated in the servo transducer would be of the waveform as shown in FIG. 10. Here negative pulses 84 and 85 are generated as a result of negative transitions 27 and 28 that occur in servo tracks $n$+2 and $n$+3, respectively. Again, it should be noted that the magnitude of the positive transitions remains a constant, regardless of the position of the servo transducer with respect to the servo tracks. This is because the servo transducer will always see the same magnitude of transition regardless of its position with respect to any servo track.

Figure 11:
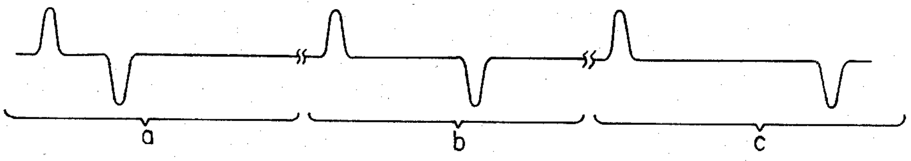
FIG. 11 (*a–c*) shows various waveforms generated in the servo transducer when the servo transducer is positioned only over track $n$ as shown in *a*, only over track $n+1$ as shown in *b*, and only track $n+2$ as shown in *c*.

FIG. 11($a$) shows in portion a the waveform that would be generated in the servo transducer when the servo transducer is centered over track n and only the negative transition 26 generates a negative pulse. Similarly, the waveform shown in sections ($b$) and ($c$) of FIG. 11 show the waveforms that would be generated if the servo transducer were centered over servo tracks $n$+1 and $n$+2, respectively, and the negative pulses are generated by negative transitions 27 and 28, respectively.

Again, it should be noted that the magnitude of the negative transitions and waveforms shown in FIGS. 8, 9 and 10 will vary as the servo transducer moves from its center position over the boundary between adjacent tracks. The magnitude of the negative pulses represents the position of the servo transducer with respect to one of the boundaries between two adjacent tracks. The time occurrence of two negative pulses gives information as to which boundary the servo transducer is attempting to follow.

With reference to FIG. 12, the demodulator 90 receives the servo signal from servo transducer 30. Here again, the servo signal is amplified by automatic gain control circuit 31 and fed to positive peak detector 32 and negative peak detector 33. The output of the positive peak detector 32 is fed to pulse shaper 33. The output of pulse shaper 33 is used as a reset line for latches 45, 46 and 47 and to start the separation clock 34. A separation system is provided which includes separation clock 34 and gates 35, 36, and 37. The pulses passed to gates 35, 36 and 37 are separated by means of the separation clock 34. The output of gates 35, 36 and 37 are fed to peak detectors 38, 39 and 40, respectively, which store the magnitude of the last negative transition that was passed through gates 35, 36 and 37. The output of peak detectors 38, 39 and 40 are fed to adder 41 for generating an automatic gain control signal for controlling the gain of the automatic gain control circuit 31. It should be noted that only two of the three peak detectors will have an output at any given time. The output of adder 41 is fed to comparator 59 to be compared against a known constant reference voltage for the generation of the automatic gain control signal.

Since the system does not know which of the two peak detectors will have a given output at any given instant of time, the output of the three possible usable combinations are compared by means of comparators 42, 43 and 44. The output of comparators 42, 43 and 44 are gated as the positioning errors by means of gates 54, 55 and 56 to sample and hold circuit 57.

It should be realized that with two of the three peak detectors 38, 39 and 40 being activated, that an output will be present at all three comparators 42, 43 and 44 since at least one active output is fed into each of the three comparators. In order to determine which output of which comparator is the true positioning signal, it is necessary to determine the position of the negative pulses that occurred between two adjacent positive pulses, that is to say, which boundary between which two adjacent tracks is the servo transducer attempting to follow. This is accomplished by means of latches 45, 46 and 47 which will store the occurrence of a pulse being transmitted through gates 35, 36 and 37, respectively. It is possible for only two of the three latches 45, 46 and 47 to be latched. AND circuits 48, 49 and 50 determine which of the three possible boundaries the servo transducer can be attempting to follow. If AND circuit 48 is activated, then the pulses received are associated with negative transitions 26 and 27 on tracks n and n+1 of FIG. 7. If AND circuit 49 is activated, then negative pulses associated with negative transitions 28 and 29 on servo track $n$+1 and $n$+2 have been sensed. If AND circuit 50 is activated, then negative transition 26 and 28 have been sensed on servo track $n$+3 and $n$+2, respectively, as shown in FIG. 7. Therefore, the output of AND circuits 48, 49 and 50 determine which boundary condition is being sensed by the magnetic transducer. OR circuits 51, 52 and 53 take into account the possibility that the servo transducer is positioned directly over one of the three servo tracks and that only one negative pulse will occur. This is shown by the input to OR circuits 51, 52 and 53 of an input labeled latch 45 only, latch 46 only, and latch 49 only, respectively. The logic necessary to determine whether only latch 45 or 46 or 47 was activated at a given instant of time is well within the state of the art. The output of OR circuits 51, 52 and 53 controls gates 54, 55 and 56, respectively, such that the proper error signal generated by comparators 42, 43 and 44, respectively, will be fed and sampled by sample and hold circuit 57 which will generate the positioning signal from the demodulator to be used by the servo system.

It should further be noted that the output of shaper 33 is the synchronization output to be used by other portions of the servo and data recovery systems.

It can readily be realized that any sequence of negative transitions across any given number of tracks may be used. It is possible to call for a discrete negative transition for each track such that by decoding the occurrence of two negative transitions, the address of the boundary between adjacent tracks that the servo transducer is attempting to follow can be readily decoded. It is readily within the skill of the art that such a system may readily be used as an addressing means for addressing the boundary to be followed by the servo transducer.

It should be obvious to those skilled in the art that this means of synchronization is applicable to magnetic storage systems such as tape drives, disk files, and magnetic drums.

While the invention has been particularly shown and described with reference to preferred embodiments thereof, it will be understood by those skilled in the art that various changes in form and detail may be made therein without departing from the spirit and scope of the invention.

What I claim is:

1. In a system for indicating position with respect to a predetermined path, means having a code member for marking $n$ paths, said code member being of the type wherein a plurality of series of pattern areas are arranged for line readout of information representative of displacement of said code member from a nominal position, said code member comprising:

$n + 1$ adjacent tracks, the boundary between any two adjacent tracks defining one of said n paths;

at least one first transition of a first polarity occurring on each of said tracks, each said first transition occurring at the same position on all said tracks;

a second transition of the opposite polarity of said first transition occurring after each of said first transitions on each of said tracks, said second transitions occurring at a position other than the position of the occurrence of a second transition on an adjacent one of said tracks; and said second transitions occurring in a defined sequence across said tracks.

2. The system as set forth in claim 1 wherein said sequence is repetitive.

3. The system as set forth in claim 2 wherein said sequence repeats every two tracks.

4. The system as set forth in claim 1 wherein each of said tracks are of the same width.

5. The system as set forth in claim 4 further comprising:

a transducer having an active width dimension equal to or less than the width of one of said tracks, said transducer generating an output signal in response to said first and second transitions, said output signal being indicative of the position of said transducer to one of said $n$ paths, and further providing synchronization and gain control information.

6. The system as set forth in claim 5 wherein said synchronization information of said output signal is generated out from said first transition sensed by said transducer.

7. The system as set forth in claim 5 wherein said positioning information is generated only from said second transition sensed by said transducer.

8. The system as set forth in claim 5 wherein said gain control information is generated only from said second transition sensed by said transducer.

9. The system as set forth in claim 5 further comprising:

a demodulator for receiving said output signal from said transducer for generating a synchronization signal, a position signal and a gain control signal from said output signal.

10. The system as set forth in claim 9 wherein said demodulator comprises a separation circuit controlled by said synchronization signal, said separation circuit separating said second transitions, said separated second transitions being used to generate said position signal and said gain control signal, said gain control signal controlling the gain of said demodulator.

* * * * *